(12) United States Patent
Holcombe et al.

(10) Patent No.: US 11,142,652 B2
(45) Date of Patent: Oct. 12, 2021

(54) SOLVENT-BASED COATING REFRACTORY COATINGS FOR FERROUS METALS

(71) Applicant: ZYP Coatings, Inc., Oak Ridge, TN (US)

(72) Inventors: Cressie E. Holcombe, Knoxville, TN (US); William Brent Webb, Oak Ridge, TN (US)

(73) Assignee: ZYP Coatings, Inc., Oak Ridge, TN (US)

( * ) Notice: Subject to any disclaimer, the term of this patent is extended or adjusted under 35 U.S.C. 154(b) by 425 days.

(21) Appl. No.: 16/058,285

(22) Filed: Aug. 8, 2018

(65) Prior Publication Data

US 2019/0264033 A1    Aug. 29, 2019

Related U.S. Application Data

(63) Continuation-in-part of application No. 15/960,779, filed on Apr. 24, 2018, which is a continuation-in-part of application No. 15/906,361, filed on Feb. 27, 2018.

(51) Int. Cl.
| | | |
|---|---|---|
| *C09D 1/02* | (2006.01) | |
| *C09D 5/02* | (2006.01) | |
| *B05B 11/06* | (2006.01) | |
| *C09D 7/20* | (2018.01) | |
| *C09D 1/00* | (2006.01) | |
| *C08K 5/01* | (2006.01) | |
| *C08K 3/22* | (2006.01) | |
| *C08L 39/06* | (2006.01) | |
| *C08K 3/38* | (2006.01) | |
| *C08L 1/04* | (2006.01) | |
| *C08K 3/36* | (2006.01) | |

(52) U.S. Cl.
CPC ............... *C09D 1/02* (2013.01); *B05B 11/06* (2013.01); *C09D 1/00* (2013.01); *C09D 5/021* (2013.01); *C09D 7/20* (2018.01); *C08K 3/22* (2013.01); *C08K 3/36* (2013.01); *C08K 3/38* (2013.01); *C08K 5/01* (2013.01); *C08K 2003/2227* (2013.01); *C08K 2003/387* (2013.01); *C08L 1/04* (2013.01); *C08L 39/06* (2013.01)

(58) Field of Classification Search
CPC ... C09D 1/02; C09D 7/20; C09D 1/00; C09D 5/021; C08K 5/01; C08K 3/22; C08K 3/38; C08K 2003/387; C08K 2003/2227; C08K 3/36; C08L 39/06; C08L 1/04; B05B 11/06
USPC ....................................................... 106/600
See application file for complete search history.

(56) References Cited

U.S. PATENT DOCUMENTS

| | | | |
|---|---|---|---|
| 3,632,359 A * | 1/1972 | Alper ................... | C04B 35/484 |
| | | | 501/103 |
| 3,832,224 A | 8/1974 | Brown | |
| 2008/0300111 A1 | 12/2008 | Meissner | |
| 2010/0009203 A1 | 1/2010 | Nageno et al. | |
| 2017/0107379 A1 | 4/2017 | Hamm et al. | |
| 2019/0263714 A1* | 8/2019 | Webb ....................... | C09D 1/02 |
| 2019/0264038 A1* | 8/2019 | Holcombe, Jr. ........ | B05D 1/28 |
| 2021/0163367 A1 | 6/2021 | Holcombe, Jr. et al. | |
| 2021/0189149 A1* | 6/2021 | Holcombe, Jr. ......... | C09D 5/08 |

FOREIGN PATENT DOCUMENTS

WO    1999016726 A1    4/1999

OTHER PUBLICATIONS

"What is the Ferrous Materials" available at the website< https://www.inspection-for-industry.com/ferrous-materials.html> 2012-2013 . (Year: 2012).*
Co-Pending U.S. Appl. No. 17/191,890, filed Mar. 4, 2021.
Co-Pending U.S. Appl. No. 17/177,937, filed Feb. 17, 2021.
Barg et al., Cellular Ceramics by Direct Foaming of Emulsified Ceramic Powder Suspensions, J. Am. Ceram. Soc., 91 (2008); The American Ceramic Society, 7 pages.
Studart, et al., "Processing Routes to Macroporous Ceramics: A Review," J. Am. Ceram. Soc., 89 (2006); The American Ceramic Society, 19 pages.
Zhenyu, Lai et al., "Preparation of Porous Materials by Magnesium Phosphate Cement with High Permeability," State Key Laboratory of Environment-Friendly Energy Materials, School of Materials Science and Engineering, Southwest University of Science and Technology, Mianyang 621010, China, Sep. 9, 2018, 8 pages.
Vogt, Joachim, "Cost-Efficient Directly Foamed Ceramics for High-Temperature Thermal Insulation," Technology Insights, 6 pages.
Mao, Xiaojian, "Processing of Ceramic Foams," Chapter 3, 2018, 18 pages.
Schundler Product Guide, The Schundler Company, "Perlite/Silicate Composites for High Temperature Insulation and Foamed Shapes," http://www.schundler.com/composites.htm, 3 pages.
Perlite Institute, "Perlite as Insulation," https://www.perlite.org/insulation, 4 pages.
NASA, "Development of Lightweight Thermal Insulation Materials for Rigid Heatshields," IITRI Project No. G-6002, 126 pages (see link at https://ntrs.nasa.gov/citations/19670009796) (article too large to upload).

* cited by examiner

*Primary Examiner* — Hannah J Pak
(74) *Attorney, Agent, or Firm* — Nexsen Pruet LLC; John B. Hardaway, III

(57) ABSTRACT

A non-aqueous solution-suspension of $R_2O$—$SiO_2$—$B_2O_3$ comprises in the dry state a composition of 2 to 30 weight percent $R_2O$, wherein $R_2O$ is an alkali metal oxide; between 10 to 74 weight percent $SiO_2$; and between 23 to 79 weight percent $B_2O_3$. Non-aqueous solution-suspensions are used to blend to give a liquid paint which, on drying, contains the composition within the range given above in the $R_2O$—$SiO_2$—$B_2O_3$ system. Non-aqueous bulk liquid and aerosol based spray paints are provided, with or without Boron Nitride additions, to allow the formation of tough, flexible coatings onto ferrous metals after bake-on.

7 Claims, No Drawings

SOLVENT-BASED COATING REFRACTORY COATINGS FOR FERROUS METALS

The current application is a continuation-in-part of U.S. application Ser. No. 15/906,361 filed Feb. 27, 2018 and U.S. application Ser. No. 15/960,779 filed Apr. 24, 2018.

BACKGROUND OF THE INVENTION

The present invention relates generally to the field of ceramic coatings and methods of making ceramic coatings and to systems for binding coatings with ferrous metals.

The present invention also relates to methods of forming ceramic solvent-based suspensions to form binders and ceramic composition based coatings on metal substrates. The coatings of the present invention have various uses and are preferably flexible, durable, hard, and dense.

SUMMARY

The parent applications of which this application is a continuation-in-part defines a tough, dense, hard, corrosion resistant, very flexible coating for ferrous metals found in the system $K_2O$—$SiO_2$—$B_2O_3$ or using $Na_2O$ or $Li_2O$ or mixtures thereof whereby the coating is made very corrosion resistant to molten aluminum by adding boron nitride h-BN (hexagonal-Boron Nitride) into the composition. All of the characteristics of these coatings as described therein are incorporated herein by reference as is the entire disclosure of the parent applications.

It is currently an object of this invention to provide a binder composition for ferrous metals which can be provided as a bulk non-aqueous solution-suspension for application to ferrous metals.

It is an additional object of this invention to provide such a non-aqueous solution-suspension that the addition of boron nitride forms a coating which is resistant to molten aluminum.

Further, the bulk non-aqueous solution-suspensions of the present invention may be combined with a propellant with or without additional solvent diluent and inserted into an aerosol container for spraying as an aerosol based spray paint.

DETAILED DESCRIPTION

The objects of this invention are achieved with a dry composition comprising 2 to 30 weight percent $R_2O$ (wherein $R_2O$ is an alkali metal oxide, $K_2O$, $Na_2O$, $Li_2O$ or mixtures thereof); 10 to 74 weight percent $SiO_2$; and 23 to 79 weight percent $B_2O_3$. Non-aqueous solutions and/or suspensions (thus referred to as solution-suspensions) are used to blend to give a liquid-binder which, on drying, contains the composition within the range given above in the $R_2O$—$SiO_2$—$B_2O_3$ system. The dry composition is mixed with sufficient solvents to form the solution-suspensions. Suitable solvents include ethanol, acetone and ethyl acetoacetate or mixtures thereof.

Examples of raw materials that may be used to form the $R_2O$—$SiO_2$—$B_2O_3$ system, although not meant to be limiting, comprise:

Potassium Silicate powder [Kasolv-16 (32.4% $K_2O$, 52.8% $SiO_2$, 14.5% $H_2O$, all by weight)]
Potassium Tetraborate powder ("KBO", $K_2B_4O_7*4H_2O$)
Ammonium Pentaborate powder ("APB", $NH_4B_5O_8*4H_2O$)
Silica "flour" (fine powdered $SiO_2$)

Any of the chemicals mentioned previously in the earlier parent patent application that can be used to generate the compositions shown on the composition diagram and also can be used in a solvent-base and have minimal water or "combined" chemical water are "suitable" for use in a pressurized aerosol-can for coating application.

Specific Examples:

Compositions that yield composition G as described in the parent application were tested with the following mixtures—

1. 7.12 g Kasolv-16 (Potassium Silicate powder, Kasolv-16 contains 32.4% $K_2O$, 52.8% $SiO_2$, 14.5% $H_2O$ per the TechicalDataSheet)
10.0 g APB (Ammonium Pentaborate powder, "APB", $NH_4B_5O_8*4H_2O$)
18.9 g Ethanol with 10 wt % Organic Suspender such as Cellulosic
Sum=36.02 g 2. 7.12 g Kasolv-16 powder
10.0 g APB powder
18.8 g Ethyl Alcohol (Ethanol) containing 10 wt % Organic
Suspender such as Cellulosic
2.5 g Boron Nitride, BN [an amount designed to yield 20% dry/fired "loading" of BN]
Sum=38.52 g These paints were too thick and too fast drying, so they were modified as follows:

3. A 50/50 by wt. mixture [i.e. 36.02 g of #1 and 36.02 g of Ethanol] was mixed and then 5% of this total weight was added of Ethyl Acetoacetate (EA)—3.6 grams EA to 72.04 grams of the liquid mixture with Ethanol.

4. A 50/50 by wt. mixture [i.e. 38.52 g of #1 and 38.52 g of Ethanol] was made and then 5% of this total weight was added to Ethyl Acetoacetate (EA)—3.85 grams EA to 77.04 grams of the liquid mixture with Ethanol.

The final compositions are

| #3 | #4 |
|---|---|
| 9.4 wt. % KBO | 8.8 wt. % KBO |
| 13.2 wt. % APB | 12.4 wt. % APB |
| 72.6 wt. % Ethanol | 70.9 wt. % Ethanol |
| 4.8 wt. % EA | 4.8 wt. % EA |
|  | 3.1 wt. % BN |

These paints, #3 and #4, were easy to brush onto Stainless Steel (SS) and dried nicely in a few minutes (not too fast due to the EA being a high-boiling point and high flashpoint liquid that is compatible with Ethyl Alcohol and Acetone). On heating the coated SS coupons to 850° C. for ½ hour "soak" or "bake-on", the #3 formed a very uniform and adherent black (visually) coating with the superior bendability of the coupon. The #4 composition also formed a very uniform white (due to the BN) coating that was bendable after the heating to "bake-on" the coating.

To initially demonstrate sprayability, a Spra-Tool was used—with the coarsest "nozzle" (there are three differing size orifice-nozzles in a Package) https://www.amazon.com/Crown-Remanufacturing-Ozone-Friendly-Spra-Toolboxed/dp/B002M6Y1VY/ref=st_1_1?ie=UTF8&qid=1488746321&sr=8-1&keywords-spry-tool The "Power-Pak" enabling the spraying utilizes "Hydrocarbon gas mixture, Liquefied N.O.S. (hydrocarbon propellant)", described further here: https://aervoe.com/files/techdata/48209pds.pdf The #3 and #4 sprayed onto the SS quite well and led to a more-uniform-thickness final coating, when compared to the first ones done with a foam-rubber brush.

This testing demonstrated that the above were solvent-based paints that work fine for brushing and should also work in an aerosol-can.

In order to test a different starting material mixture, the following were made up and designed to have the same solids content after firing as #1 and #2 above—

1+. 6.9 g KBO (Potassium Tetraborate powder, "KBO", $K_2B_4O_7 \cdot 4H_2O$] powder
    4.33 g APB (Ammonium Pentaborate) powder
    4.46 g $SiO_2$ "flour"—fine powder
    18.9 g Ethanol with 10 wt % Cellulosic suspender added
Sum=34.59 g 2+. 6.9 g KBO (Potassium Tetraborate powder, "KBO", $K_2B_4O_7 \cdot 4H_2O$] powder
    4.33 g APB (Ammonium Pentaborate) powder
    4.46 g $SiO_2$ "flour"—fine powder
    18.9 g Ethanol with 10 wt % Cellulosic suspender added
    2.5 g BN [an amount designed to yield 20% dry/fired "loading" of BN Sum=37.09 g These paints were mixed until uniform and then immediately modified as before . . .

3+. A 50/50 by wt. mixture [i.e. 34.59 g of #1 and 34.59 g of Ethanol] was made and then 5% of this total weight was added of Ethyl Acetoacetate (EA)—3.46 grams EA to 69.18 grams of the liquid mixture with Ethanol.

4+. A 50/50 by wt. mixture [i.e. 37.09 g of #1 and 37.09 g of Ethanol] was made and then 5% of this total weight was added of Ethyl Acetoacetate (EA)—3.71 grams EA to 74.18 grams of the liquid mixture with Ethanol.

The final compositions are

| #3+ | #4+ |
|---|---|
| 9.5 wt. % KBO | 8.9 wt. % KBO |
| 6.0 wt. % APB | 5.6 wt. % APB |
| 6.1 wt. % $SiO_2$ | 5.7 wt. % $SiO_2$ |
| 73.6 wt. % Ethanol | 71.9 wt. % Ethanol |
| 4.8 wt. % EA | 4.8 wt. % EA |
| | 3.2 wt. % BN |

These paints (#3+ and #4+), after mixing uniformly, were also easy to brush onto SS and dried nicely in a few minutes (not too fast due to the EA being a high-boiling point and high flashpoint liquid that is compatible with Ethyl Alcohol and Acetone). On heating the coated SS coupons to 850° C. for ½ hour "soak" or "bake-on", the #3+ formed a very uniform and adherent black (visually) coating with the superior bendability of the coupon. The #4+ composition also formed a very uniform white (due to the BN) coating that was bendable after the heating to "bake-on" the coating.

However, on "finger-rubbing" these coatings a whitish film appeared (easier to see on the #3+ composition due to it being black). It is believed that this whitish film is from the $SiO_2$ "flour" not totally being dissolved into the glassy-phase of the coating. Thus, while these formulations work, the first ones without $SiO_2$ flour are preferable.

The above examples utilizing non-aqueous binder liquids do not require any calcination or fritting to yield tough, hard, flexible coatings described in the parent application hereto. It is a main advantage of these example compositions that they do not require any calcination or fritting of the mixture in order to work for these solvent-based formulations. This compares with the compositions described in the parent application hereof wherein it was often necessary to form a frit or calcine the ingredients in order to get a uniform binder phase. HOWEVER, it is recognized that a finely ground calcined (700° C. for 4-6 hours) or fritted (melted, generally above 1000° C. for a period of time and then ground to a fine powder) powder could be used alone (with Ethanol plus Organic suspender).

Further testing with these non-aqueous solution-suspension composition systems has showed that they can be used with added boron nitride as well as other refractories and that they will bind the refractory materials to a ferrous materials.

When boron nitride is desired in the paint formulation, it is preferred that the content of the boron nitride be 5% or more based on the dry/fired solids content, i.e. after heating to the bake-on temperature. Boron nitride additions allow non-wetting wt h molten aluminum as do some other additives such as Al2TiO5 and BaSO4. Additional additives comprise, but are not limited to, $CeO_2$, $Y_2O_3$, NiAl, TiAl, $MgAl_2O_4$, $Al_2O_3$, Si—Al—ON, SiC. The addition of 1 to 2% $Al_2O_3$ to the liquid paint compositions has found to increase the useful temperature of the baked-on coatings to over 1000° C.

Potassium oxide, sodium oxide, lithium oxide or mixtures thereof represent the "$R_2O$" in the ternary composition $R_2O$—$SiO_2$—$B_2O_3$ system, which can be achieved by ingredients that are compatible with the non-aqueous carrier solvents. Organic or inorganic suspenders in low levels can be added. Examples of typical suspenders and/or binders include cellulosics, including hydroxypropylcellulose or ethyl cellulose, and polyvinylpyrrolidone. Preferably, the organic binders/polymers would completely oxidize away on first heat-up/bake-on or they would contain small amounts of $R_2O$ after heat-up/bake-on. Also, viscosity modifiers that are compatible with non-aqueous fluids and liquids, such as organoclays can be utilized. However, these organic-Inorganic modifiers can affect the properties of the resultant glass-ceramic bond-coat from the $R_2O$—$SiO_2$—$B_2O_3$ system.

While the examples above are for non-aqueous brushable paints, the following discloses an example composition of the aerosol system, which was incorporated into an aerosol-can system to create an aerosol based spray paint or coating.

Liquid Paint 9.5 wt. % KBO
13.4 wt. % APB
65.4 wt. % Ethanol
1.9 wt. % Acetone
2.6 wt. % EA
3.5 wt. % BN
3.8 wt. % Organic suspender/modifier Diluent Ethanol or Acetone or blends of these Propellant Liquefied Petroleum Gas or
Blends of Propane and N-Butane/Isobutane or any other Compatible propellant These are blended at one-third of each typically, although this can be modified as desired to achieve the best atomization/spraying out of the aerosol-can. Thus, to produce an aerosol system, a propellant additive must be combined with the non-aqueous paint—with or without a diluent solvent.

When sprayed from the aerosol-can onto SS, very uniform coatings can be applied and dry quickly. On heating the coated SS coupons to 850° C. for 1½ hour "soak", very uniform white (due to the BN) coating was produced—tough and bendable after the heating to "bake-on" the coating.

While this example used BN as "filler", similar compositions without the BN have also been tested, yielding good coatings on SS after "bake-on"—visually appearing black when no BN is incorporated into them. And, other refractory fillers may also be incorporated into the aerosol system creating an aerosol based spray paint or coating.

Example of ferrous metal useful in forming the coatings of this invention include:

Stainless 304
Stainless 316
Stainless 430

Haynes alloy 214

Inconel 718

H13

Having generally described the invention in exemplary terms, such terms are not deemed to be binding but limited only by the following appended claims.

What is claimed:

1. A liquid binder system for binding ceramic and metal systems, wherein the liquid binder system comprises:

a non-aqueous solution-suspension of $R_2$—O—$SiO_2$—$B_2O_3$ comprising in a dry state, a composition of 2 to 30 weight percent $R_2O$, wherein $R_2O$ is an alkali metal oxide; between 10 to 74 weight percent $SiO_2$; and between 23 to 79 weight percent $B_2O_3$, suspended in liquid selected from the group consisting of ethanol, acetone and ethyl acetoacetate, and mixtures thereof.

2. The liquid binder system of claim 1 wherein the liquid binder system further comprises boron nitride (h-BN) content which is >/=5% of the total solids content after heating to 800° C. in an air atmosphere.

3. The liquid binder system of claim 1 wherein the liquid binder system further comprises a material selected from the group consisting of $Al_2TiO_5$, $BaSO_4$, $CeO_2$, $Y_2O_3$, NiAl, TiAl, $MgAl_2O_4$, $Al_2O_3$, Si—Al—ON, SiC, and mixtures thereof.

4. A ferrous metal having a coating thereon formed from the liquid binder system of claim 1, wherein the ferrous metal is selected from the group consisting of:

Stainless 304,

Stainless 316, and

Stainless 430.

5. The liquid binder system of claim 3 wherein the liquid binder system further comprises $Al_2O_3$to extend its use temperature in air atmospheres to over 1000° C.

6. The liquid binder system of claim 1 wherein a propellant is combined with the non-aqueous solution-suspension.

7. The liquid binder system of claim 6, where the propellant is selected from liquefied petroleum gas, and blends of propane and N-butane/isobutane.

* * * * *